(12) United States Patent
Harris

(10) Patent No.: US 6,702,518 B2
(45) Date of Patent: Mar. 9, 2004

(54) UNDERGROUND CONVEYANCE PROTECTION DEVICE AND METHOD

(76) Inventor: Mark Frog Harris, P.O. Box 11796, Philadelphia, PA (US) 19101-1796

( * ) Notice: Subject to any disclaimer, the term of this patent is extended or adjusted under 35 U.S.C. 154(b) by 0 days.

(21) Appl. No.: 09/752,702

(22) Filed: Dec. 29, 2000

(65) Prior Publication Data
US 2002/0085884 A1 Jul. 4, 2002

(51) Int. Cl.7 ................................................ F16L 57/00
(52) U.S. Cl. ..................... 405/157; 138/104; 138/105
(58) Field of Search ............................ 405/157, 184.4, 405/154.1, 50, 15, 18, 107, 112, 114, 115, 302.6, 302.7; 138/104, 105

(56) References Cited

U.S. PATENT DOCUMENTS

| | | | | |
|---|---|---|---|---|
| 1,588,897 A | * | 6/1926 | Marston | 405/157 |
| 3,115,681 A | * | 12/1963 | Allen | 405/157 |
| 3,581,703 A | * | 6/1971 | Hosack | 405/157 |
| 3,922,832 A | * | 12/1975 | Dicker | 52/741.15 |
| 3,952,529 A | * | 4/1976 | Lefever | 405/184.4 |
| 3,957,098 A | * | 5/1976 | Hepworth et al. | 405/17 |
| 4,623,282 A | * | 11/1986 | Allen | 405/157 |
| 4,654,639 A | * | 3/1987 | De Courville | 405/157 |
| 4,781,958 A | * | 11/1988 | Gilbert | 405/157 |
| 4,820,080 A | * | 4/1989 | Varkonyi et al. | 405/45 |
| 4,879,162 A | * | 11/1989 | Hansen, Sr. | 405/157 |
| 4,983,068 A | * | 1/1991 | Kozak et al. | 405/36 |
| 5,006,806 A | | 4/1991 | Rippingale et al. | |
| 5,017,873 A | | 5/1991 | Rippingale et al. | |
| 5,100,258 A | * | 3/1992 | VanWagoner | 405/50 |
| 5,122,750 A | | 6/1992 | Rippingale et al. | |
| 5,385,430 A | * | 1/1995 | Connors | 405/157 |
| 5,584,599 A | * | 12/1996 | Knittel | 405/15 |
| 5,644,237 A | | 7/1997 | Eslambolchi et al. | |
| 5,713,696 A | * | 2/1998 | Horvath et al. | 405/50 |
| 5,829,915 A | * | 11/1998 | Andreassen | 405/18 |
| 6,127,827 A | | 10/2000 | Lewis | |
| 6,315,493 B2 | * | 11/2001 | Malone et al. | 405/50 |

* cited by examiner

Primary Examiner—Frederick L. Lagman
(74) Attorney, Agent, or Firm—Mathews, Collins, Shepherd & McKay, P.A.

(57) ABSTRACT

Disclosed above are a device and method for protecting underground conveyances, wherein the device comprises a carrier containing fill material and, optionally, comprising a web material reinforcing the carrier. The device is oriented over an underground conveyance above a given amount of backfill so that it is detected and encountered by an excavator before the underground conveyance is damaged. In one embodiment, the device is preferably retrieved or brought to view when the webbing is snagged on the teeth of the excavating equipment.

6 Claims, 4 Drawing Sheets

UNDERGROUND CONVEYANCE PROTECTION DEVICE AND METHOD

FIELD OF THE INVENTION

This invention relates generally to a method and device for protecting underground utility conveyances from damage such as might be caused by excavation.

BACKGROUND OF THE INVENTION

It is well known that utilities bury their pipes and/or cables (hereinafter, "conveyances") underground to protect the conveyances from the elements, i.e., wind, rain and sunlight, as well as for cosmetic reasons. However, because the conveyances are hidden from view, they are susceptible to severing, breakage, puncturing, or other damage due to excavation. It is well known that in order to avoid damage caused by excavation utilities often record the location of such conveyances and sometimes mark said conveyances with stakes, posts, or other types of marking means.

It is also well known that utilities have used electromagnetic signaling to locate underground conveyances in order to avoid damaging them during excavations. As set forth in U.S. Pat. No. 5,644,237, incorporated herein by reference, typically the utility applies an alternating current signal at a unique frequency to each buried conveyance either directly or to a separate wire buried adjacent to the conveyance. A technician seeking to locate the conveyance employs a cable-locating detector such as a radio frequency (RF) receiver tuned to the frequency of the signal impressed on the conveyance. Because of stray electromagnetic signals radiated by other underground conveyances lying nearby, the technician may not be able to locate the exact position of the conveyance of interest. As a result, the technician may have to physically uncover the buried conveyance in order to establish its exact location U.S. Pat. No. 5,438,265, incorporated herein by reference, discloses a cable-locating device that utilizes an RF detector and a viewing mechanism, such as a television camera or the like, to precisely locate a buried utility conveyance. Such an approach is complex and expensive and requires a means of excavation provided within the device for removing the earth in the vicinity of the cable to allow observation by the viewing mechanism.

Another approach that has been employed in the prior art is to associate permanent magnets with a fiber optic cable as by providing magnets on a tracer tape buried separately along with the cable in order to assist in locating and tracing the cable. U.S. Pat. No. 5,006,806, disclosed herein by reference, discloses an apparatus for marking, locating, tracing, and identifying hidden conveyances by providing the conveyances with elongated, permanent magnet identifier devices having magnetic fields that may be detected at a distance from the objects. However, this approach has several disadvantages, including the possibility that the tracer tape will be installed improperly and thus will not be detected. The limited distance at which the tape can be detected and the inability to reliably distinguish the weak magnetic field of the magnets from magnetic fields associated with ferrous pipes, for example, that may be buried in the same area is also a significant drawback.

U.S. Pat. No. 5,194,812, incorporated herein by reference, discloses a method of identifying a cable buried underground in which an alternating current signal is applied to the cable and the magnetic field due to the current signal is detected using a magnetic field sensor brought into proximity with the cable.

However, the foregoing approaches have several disadvantages, including interference of electromagnetic signals caused by other conveyances and objects within the earth and the inherent fallibility of sensing devices. In addition, the need for sensing equipment is a drawback because of cost and because excavators may not always be equipped with the proper sensing equipment for a given system.

It is also well known to install plastic warning layers above buried conveyances to alert excavators to their presence. However, such plastic warning layers are often ignored by excavators or equipment operators, who dismiss the plastic layers as refuse or simply buried garbage. Often, the plastic warning layers are simply punctured by the excavating equipment and remain buried because they do not come to the surface or become more visible as a result of excavation. Thus, there is the need for a simplified, low-cost device and method for preventing damage to underground conveyances.

BRIEF DESCRIPTION OF THE INVENTION

The present invention provides a new device and method for preventing damage to buried hidden objects such as underground conveyances, namely cables, pipes, tubes, ducts, conduits and the like.

The present invention provides a device which provides color and texture contrast to backfill, is highly reflective and provides a means for excavating equipment to bring the device to the surface and to the attention of the equipment operator to alert the operator to the presence of a buried conveyance.

In accordance with one of the broader aspects of the invention, an elongated carrier material is filled with a suitable material and said carrier material further comprises a webbing around or within said carrier. The device comprising essentially the carrier, the suitable material and the webbing is disposed along the axis of an elongated hidden object such as a utility conveyance after said conveyance is installed in the ground and preferably after installing a suitable amount of backfill, approximately six inches to four feet of backfill, the device is installed directly on the backfill along the longitudinal axis of the conveyance and is typically lain along the entire length of the conveyance. The carrier of the device is typically any material suitable for carrying the material to be contained therein, including but not limited to plastic sheeting, plastic sacking or a suitable fabric, cloth or cloth-like material and the like. The carrier can alternatively comprise PVC pipe, lightweight metal tubing or the like. The fill material typically comprises crushed or broken glass but optionally may comprise colored or uncolored gravel or a suitable substitute. The webbing material typically consists of wire or woven wire but may comprise high-strength PVC netting or a suitable substitute such as but not limited to natural or synthetic woven or unwoven fiber. It is contemplated that the device is placed far enough above the underground conveyance so that the device takes the impact of any excavation equipment such as a backhoe or a trencher before such equipment contacts the underground conveyance. The device therefore acts as a warning layer that alerts excavators to the presence of an underground conveyance. In a most preferred embodiment, the device is a wire-wrapped plastic sack containing colored crushed glass. The device provides color and texture contrasts to soil and backfill, is highly reflective, is readily noticeable in its packaging, and the wire wrapping readily snags on the teeth of a backhoe to bring it up to alert the equipment operator before digging continues downward into the excavation toward the valuable underground conveyance. The wire wrap may also be located by electromagnetic sensing equipment.

BRIEF DESCRIPTION OF THE DRAWINGS

The invention will be further described in conjunction with the accompanying drawings, which illustrate preferred embodiments of the invention and wherein.

DETAILED DESCRIPTION OF THE PREFERRED EMBODIMENTS

Figure 1:
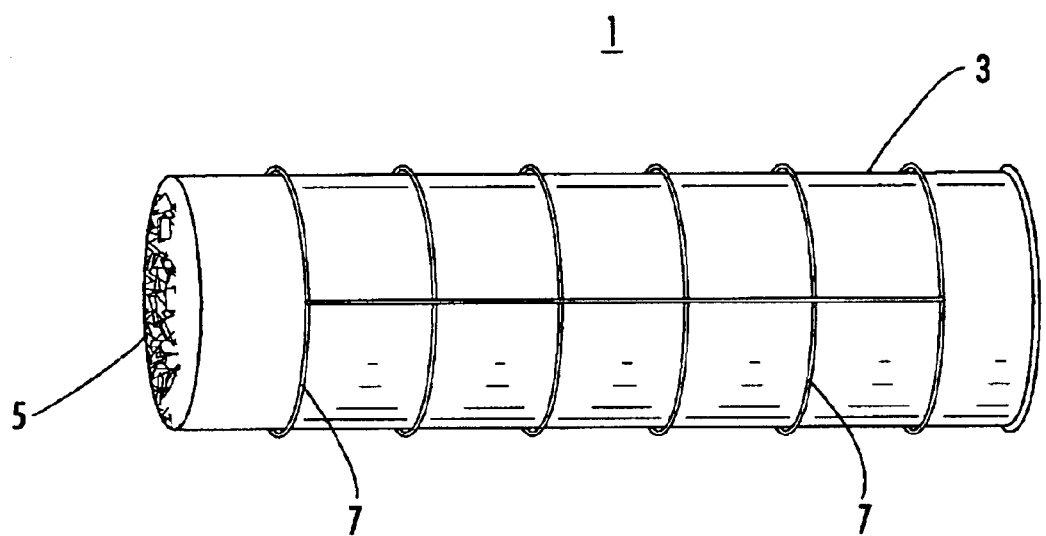
FIG. 1 is a top perspective view of a section of one embodiment of the present invention.

Referring to the drawings, FIG. 1 illustrates one embodiment of the device 1 of the present invention comprising carrier 3, fill material 5 and web 7.

Carrier 3 is a longitudinal means for containing fill material 5, and typically comprises plastic sheathing or sacking material. The carrier 3 may also comprise other material such as but not limited to PVC pipe or the like. The carrier 3 is preferably a plastic nonbiodegradable material so as to maintain its integrity while in the ground.

The fill material 5 comprises any loose, solid material such as crushed glass, broken glass, gravel, metal material or the like, but preferably comprises colored crushed glass. Webbing 7 may comprise metal wire or mesh, plastic webbing or mesh or even suitable synthetic fiber or thread. As best seen in FIG. 1, in one embodiment, carrier 3 encapsulates fill material 5. Webbing 7 surrounds carrier 3.

Figure 2:
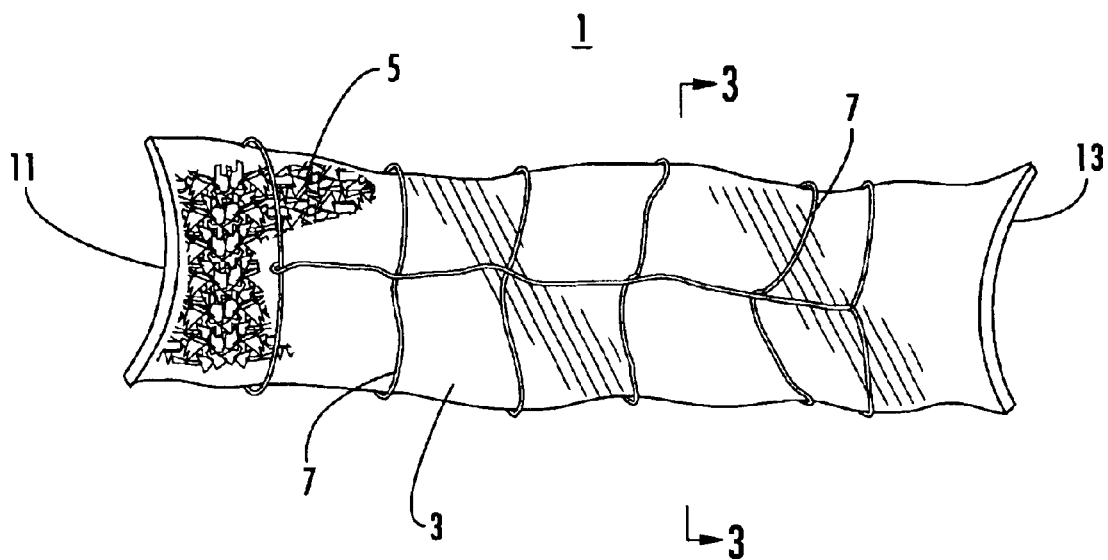
FIG. 2 is a top plan view of a preferred embodiment of the present invention.
Figure 3:
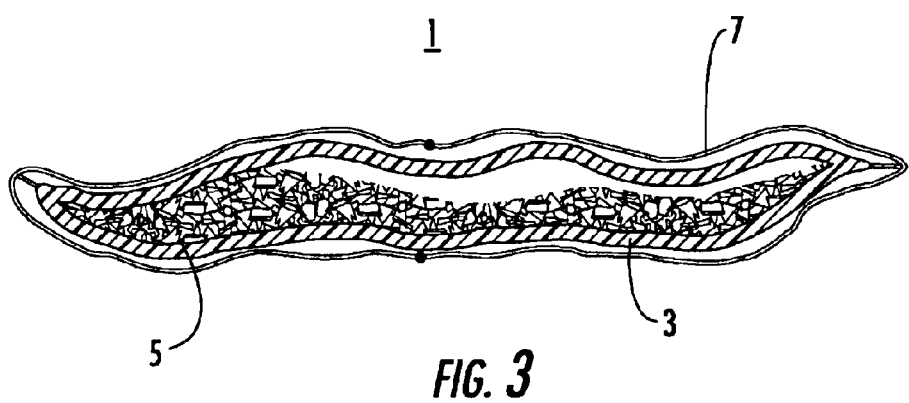
FIG. 3 is a cross-sectional view of the present invention taken through the line III—III of FIG. 2.

Now referring to FIG. 2 and FIG. 3 in a preferred embodiment, fill material 5 is contained within carrier 3 wherein carrier 3 is a plastic bag having sealed ends 11 and 13 with webbing 7 surrounding carrier 3. Alternatively, web material 7 is contained within carrier 3, such as where carrier 3 is a plastic bag material having therein a wire or mesh webbing. The carrier 3 is preferably not filled to capacity with fill 5 so that the device 1 will sag into place when installed.

Figure 4:
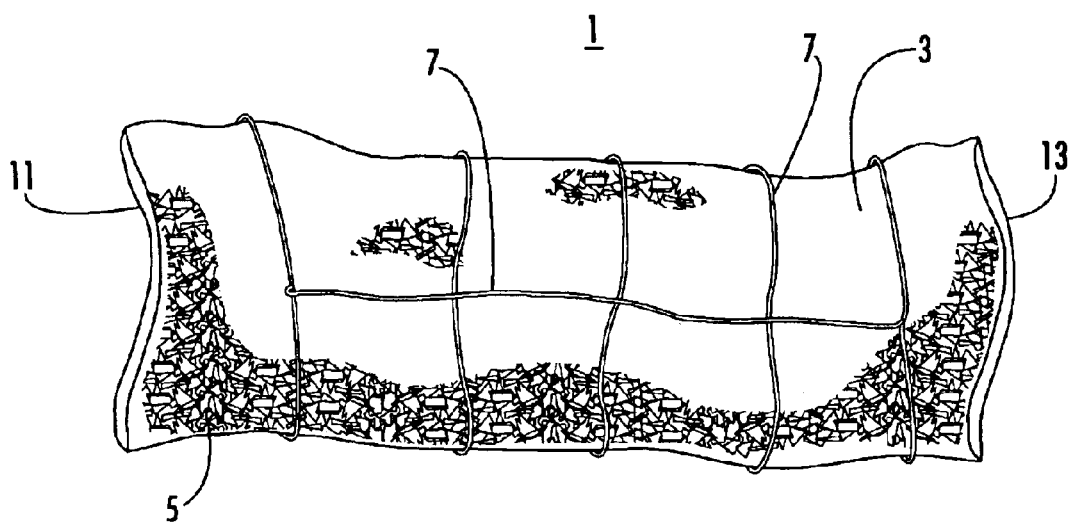
FIG. 4 is a top plan view of a most preferred embodiment of the present invention.

Now referring to FIG. 4, in a most preferred embodiment, carrier 3 is brightly colored (i.e., orange, yellow, etc.) plastic, such as polyethylene bagging. Fill material 5 is colored crushed glass, preferably green, and webbing 7 is wire mesh having openings between said wires of at least 3 inches in diameter. In this embodiment, the present invention provides color and texture contrast to soil and backfill, is highly reflective, is readily noticeable in its bright packaging, and the wire wrap or webbing 7 readily snags on the teeth of a backhoe to bring it up to alert the excavator to the presence of the underground conveyance.

The pattern of webbing 7 can be any suitable pattern that will not become removed from carrier 3 by excavating equipment or during installation. The spacing between the strands of webbing 7 should be sufficient to allow the tines of a backhoe bucket to engage and lift the device 1 during excavation. Though not pictured, the webbing 7 can wrap around the ends of the carrier 3.

Figure 5:
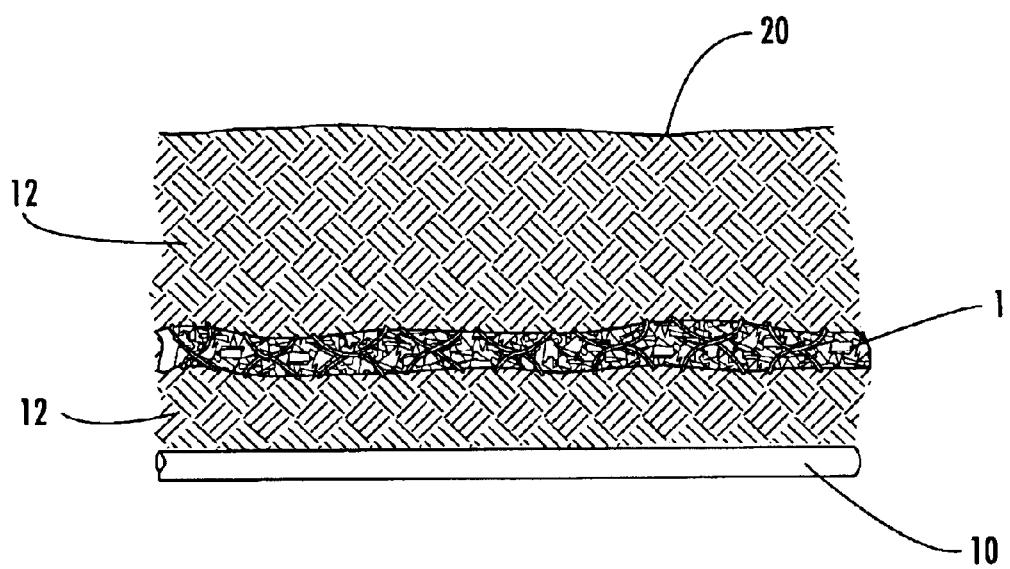
FIG. 5 is a diagrammatic perspective view illustrating the orientation of the device of the present invention as typically installed in the ground.

The following describes the method of using and installing the device of the present invention. Now referring to FIG. 5, showing the device 1 installed under the ground surface 20 after installation of the underground conveyance 10, an operator backfills over the underground conveyance 10 from about six inches to about four feet with soil or backfill 12. The device 1 of the present invention is then laid over the backfill along the long axis of the underground conveyance 10. The remainder of backfill 12 is then installed over the device 1. In a most preferred embodiment, the device 1 is installed after backfilling from about six inches to about 12 inches. It is most preferable to have about one foot of backfill 12 between the underground conveyance 10 and the device 1 so that the device will take the impact and be dragged to the surface before excavation equipment contacts the underground conveyance 10. Excessive backfilling should be avoided to eliminate the possibility that careless excavators might disregard the warning provided by the device 1 if the underground conveyance 10 is not encountered soon after the excavation of the device 1 of the present invention. It is contemplated that carrier 3 is narrow when it is to be employed for small-gauge underground conveyances such as cable television cables, gas feeders to residences and electrical branches. Larger carriers 3 should be employed for wider applications such as multiple cable installations, gas mains, transformer feeds and large pipes. The orientation of the device 1 depends on the width of protection needed, and it is contemplated that one skilled in the art would understand the proper orientation of device 1 of the present invention. For example, installation of the device 1 over a residential gas line, typically about 1" in diameter, suggests use of a device of only about 6"–12" inches or less in width. Orientation of such a device is preferably along the longitudinal axis of the gas line. It is further contemplated that prime locations for installing the device 1 are those where utility lines cross shallowly buried conveyances locations near meters, near utility poles and manholes, burrow entrances and exits, under sidewalks and anywhere construction or excavation is anticipated. The foregoing device and method provides a simple, environmentally friendly solution to the problem of protecting underground conveyances.

While preferred embodiments of the invention have been shown and described, it will be apparent to those skilled in the art that changes can be made in these embodiments without departing from the principles and spirit of the invention, the scope of which is defined in the appended claims.

What is claimed is:

1. An underground conveyance protection device comprising: an elongated carrier, a fill material contained within said carrier; and, a web material wrapped around said carrier, wherein said fill material is highly reflective and said web material comprises wire mesh forming openings wherein said openings are at least about 3 inches in diameter.

2. A method for protecting an underground conveyance employing the device of claim 1 comprising the steps of:

a) backfilling above a conveyance an amount of backfill or soil from about six inches to about four feet in depth, b) installing said device on said backfill or soil, and c) backfilling a remainder of backfill or soil over said device.

3. The method according to claim 2 wherein said fill depth above said conveyance and below said underground conveyance protection device is between about six inches and about 12 inches.

4. An underground conveyance protection device comprising: an elongated carrier, a fill material contained within said carrier; and, a web material wrapped around said carrier, wherein said carrier has at least one end and further comprises a sheath of material closed at least one end and wherein said fill material consists essentially of crushed glass.

5. The device according to claim 4 wherein said sheath of material is selected from the group consisting of plastic, cloth and metal.

6. A method for providing a warning layer that alerts excavators to the presence of an underground conveyance by employing a device comprised of an elongated carrier, a fill material contained within said carrier and a web material wrapped around said carrier, wherein said fill material provides color and texture contrast to backfill or soil and is selected from the group consisting of glass, rock and metal; comprising the steps of:

a) backfilling above the conveyance an amount of backfill or soil from about six inches to about twelve inches in depth, b) installing said device over said about six inches to about twelve inches backfill or soil, and c) backfilling a remainder of backfill or soil over said device.

\* \* \* \* \*